United States Patent Office 3,252,069
Patented May 17, 1966

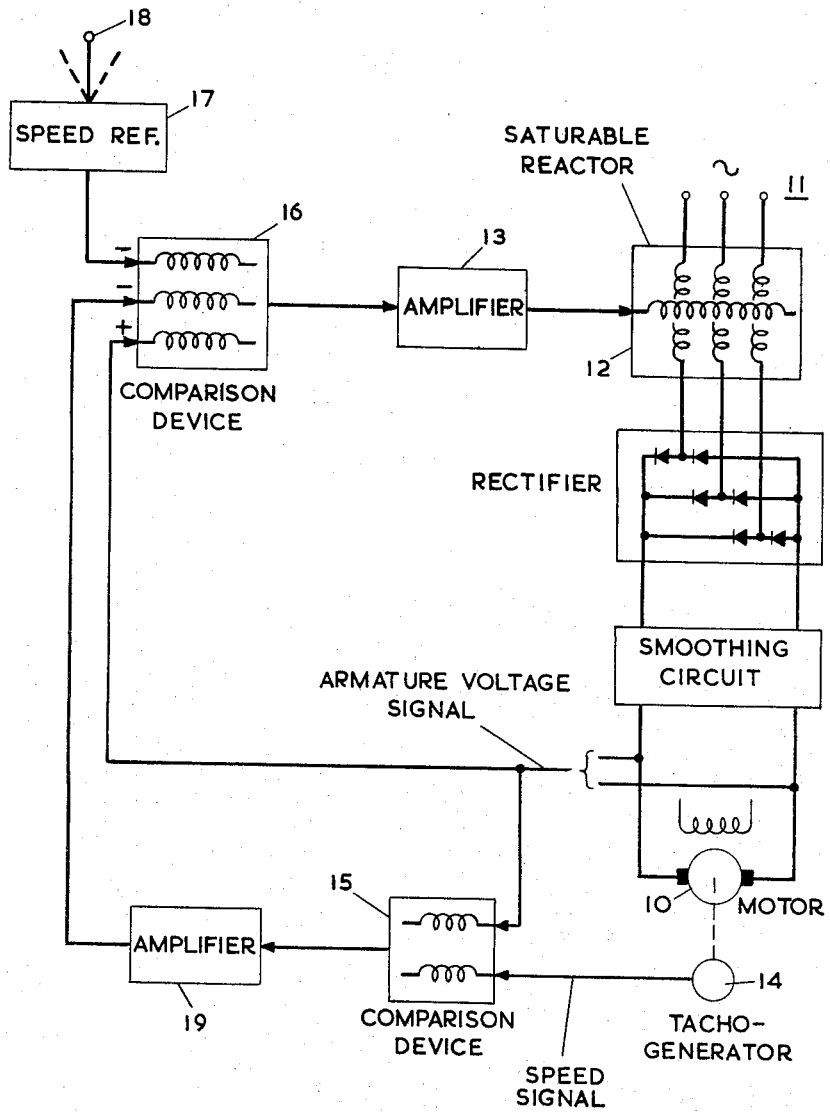

3,252,069
SPEED CONTROL SYSTEMS FOR ELECTRIC MOTORS
Bryan Edwin Ringrose, Kidsgrove, Stoke-on-Trent, England, assignor to The English Electric Company Limited, Strand, London, England, a British company
Filed Sept. 25, 1962, Ser. No. 226,129
Claims priority, application Great Britain, Oct. 2, 1961, 35,508/61
6 Claims. (Cl. 318—308)

This invention relates to a speed control system for an electric motor whose speed may be varied by variation of the voltage applied to one of the members of the motor. For example the invention is applicable to the control of a separately excited D.C. motor, the speed of such a motor being variable by varying the D.C. voltage applied to its armature circuit, or alternatively by varying the D.C. voltage applied to the field system of the motor. As a further example, the invention is also applicable to the control of an induction motor since its speed is variable by varying the A.C. voltage applied to its primary winding or member.

According to the present invention a speed control system for such an electric motor includes, in combination, a main regulating means for regulating the flow of electrical energy from a supply source to a speed control winding of an electric motor and having closed-loop control means for automatically maintaining the voltage supplied to the motor winding in accordance with a net input energisation of the regulating means, adjustable reference means for supplying a reference input energisation to the regulating means in dependence upon the setting of an adjustable speed setting member, an auxiliary regulating means responsive to the difference of a motor winding voltage dependent signal and a motor speed dependent signal for supplying an electric control signal to the same or another speed control winding of the motor or to a control winding or element of the main regulating means in a manner such as to adjust the motor speed automatically in a sense tending to substantially compensate for variations in the load carried by the motor.

According to another feature of the present invention the said electric control signal produced by the auxiliary regulating means is supplied to a control winding or element of the main regulating means, and the main regulating means comprises a power amplifying means for supplying current to the speed control winding of the electric motor in dependence upon the magnitude of a controlling direct current energisation supplied to the power amplifying means, and means responsive to three electric signals for supplying the controlling direct current energisation for the power amplifying means in dependence upon the algebraic sum of the three electric signals, the three electric signals comprising a first signal acting in a first sense and being supplied by the adjustable reference means, a second signal acting in a sense opposite to the said first sense and being dependent on the voltage developed across the speed control winding of the motor, and a third signal acting in the said first sense and being dependent upon the difference of an electric signal dependent upon the voltage developed across the speed control winding of the motor and a fourth electric signal which is dependent on the motor speed.

According to another feature of the present invention the means for supplying the controlling energisation for the power amplifying means includes a control means responsive to the three electric signals for producing an auxiliary control signal dependent upon the algebraic sum of the three signals, and an amplifying means responsive to this auxiliary control signal for supplying the controlling direct current energisation for the power amplifying means.

The power amplifying means may comprise a saturable reactor device.

One closed loop speed control system according to the present invention for a separately-excited D.C. motor will now be described by way of example and with reference to the accompanying drawing which shows a diagram of the control system in schematic block form.

Referring now to the drawing the armature circuit 10 of a separately-excited D.C. motor is supplied with direct current from A.C. supply source 11 through a saturable reactor 12 and a rectifying and smoothing means which is not shown. The saturable reactor inherently acts to control the magnitude of the direct current flowing in the armature circuit at a value dependent on the value of a controlling direct current supplied to it by an amplifier 13.

A tachogenerator 14 driven by the motor provides a speed dependent electrical signal which is compared in a comparison device 15 with an electrical signal dependent on the voltage developed across the motor armature circuit 10. This comparison device 15 responds differentially to the two signals so as to produce a feedback signal dependent on the excess (positive or negative) of the armature voltage signal over the motor speed signal.

A further comparison device 16 responds to three signals, (a) a speed reference signal provided by a speed controller 17, and being dependent upon the setting of a speed control member 18, (b) a first feedback signal provided by an amplifier 19 which is controlled by the aforesaid feedback signal provided by the comparison device 15, and (c) a second feedback signal dependent on the motor armature voltage. This comparison device 16 responds to the first two signals (a) and (b) in one sense and to the third signal (c) in the opposite sense, so that an output signal supplied thereby to the amplifier 13 is dependent on the resultant or algebraic sum of the three signals. This output signal is applied to the amplifier 13 in a sense such as to maintain the motor speed substantially in accordance with the setting of the speed control member 18 independently of motor load variations.

The armature voltage signal fed back to the comparison device 16 renders the saturable reactor 12 operative as a voltage source rather than as a current source as would otherwise be the case if this voltage feedback signal were omitted.

The aforesaid first feedback signal provided by the amplifier 19 is effective when, due to a change in motor load, the speed departs from a value determined by the motor armature voltage to vary the resultant energisation of the comparison device 16 whereby in turn to vary the control signal applied to the saturable reactor 12, and hence the armature voltage, in a sense tending a compensate for changes in motor load.

For example, a decrease in motor speed due to an increase in motor load results in a decrease in the speed signal and hence an increase in the feedback signal produced by the amplifier 19. The resulting increase in the energisation of the comparison device 16 gives rise to an increase in the saturable reactor control signal and hence in the motor armature voltage. The system settles at an equilibrium condition in which the increased energisation of the comparison device 16 is sufficient to maintain the desired speed within a predetermined limit of accuracy for the new load condition.

It will be appreciated that the comparison device 16, the amplifier 13, the saturable reactor 12 and the associated armature voltage feedback link constitutes an auxiliary high-gain closed loop voltage control system for maintaining the armature voltage in accordance with the resultant energisation of the comparison device 16, whilst a further high-gain closed loop is formed around the aforesaid voltage control loop by the feedback link which includes the comparison device 15 and amplifier 19. By so arranging the circuit, the difficulty introduced by the use of a saturable reactor for supplying the armature current (in that such a reactor is essentially a constant current device) is obviated. This fact greatly assists in rendering the speed control system stable, since without the auxiliary voltage control loop the saturable reactor introduces an integral effect into the speed control system.

A similar speed control system may be used for supplying and controlling an induction motor. In such a case, the A.C. output of the saturable reactor is passed directly to the motor, the aforesaid rectifying and smoothing means used in connection with the D.C. motor being omitted.

Preferably, the amplifier 13 is of the kind which utilises the amplifying ability of the silicon-controlled rectifier; other kinds of suitable amplifier may of course be used, for example magnetic or transistor ampifiers.

The functions of the comparison device 16 and the amplifier 13 may be combined in a single amplifying device of appropriate form. Likewise, the functions of the amplifying device 19 and the comparison device 15 may be combined in a single amplifying device of appropriate form.

Whereas in the above described speed control system the first feedback signal (*b*) is applied to the comparison device 16, in a modified system the comparison device 16 is differentially responsive to the signals (*a*) and (*c*) only, and the signal (*b*) is applied to the amplifier 13 so as to assist the signal supplied to it by the comparison device 16.

Alternatively, the first feedback signal (*b*) in this modified speed control system may be applied, instead of to the amplifier 13, to a speed control winding of the motor so as to assist the action of the saturable reactor in controlling the motor speed. For example, the first feedback signal may be applied to a field winding of the motor, or otherwise to the armature circuit of the motor in series with the output voltage of the saturable reactor.

Though in the system described with reference to the drawing the power regulating means is constituted by the saturable reactor 12 and its associated closed loop control means for controlling its output voltage, any other form of power regulating means having closed loop voltage control means may be used in its place. For example, such other power regulating means may incorporate closed loop controlled rotating, magnetic or controlled rectifier amplifying means.

In cases where the field excitation of a D.C. motor is also to be varied to give further variation of the motor speed, for example after completing the range of speed variation by variation of armature circuit voltage, the speed dependent signal supplied to the comparison device 15 must be automatically decreased as the field excitation of the motor is decreased and vice versa. For example the speed dependent voltage supplied to the comparison device 15 may be derived from an adjustable tapping on a potentiometer which is supplied by the tachogenerator 14, and this tapping is ganged for movement with a regulator for varying the motor field excitation.

What I claim as my invention and desire to secure by Letters Patent is:

1. A speed control system for an electric motor having a speed controlling winding including means for producing a speed reference signal, means for producing a signal dependent on the motor speed, means for producing a feedback signal dependent on the voltage developed across the speed controlling winding, current regulating means responsive differentially to the speed reference signal and to the said feedback signal for varying the flow of electrical current from a supply source to the speed controlling winding of the motor in a sense tending to maintain the said voltage in accordance with the speed reference signal, means responsive differentially to the said feedback signal and the motor speed dependent signal for producing a modifying signal dependent on the loading of the motor, and modifying means associated with the current regulating means for rendering the current regulating means responsive to the modifying signal in a sense such as to assist the speed reference signal and thereby compensate for motor loading.

2. A speed control system according to claim 1, wherein the current regulating means comprises a saturable reactor having an alternating current winding arrangement for connection between the supply source and the speed controlling winding for regulating the flow of current to the speed controlling winding, the saturable reactor having also a direct current control winding arrangement for receiving a control signal, and amplifying means for receiving the speed reference signal, the said feeding signal, and the modifying signal and for supplying the said control signal to the direct current control winding arrangement of the saturable reactor whereby to control the electrical impedance of the alternating current winding arrangement of the saturable reactor in dependence upon the net energisation of the amplifying means.

3. A speed control system according to claim 2, wherein the motor is a direct current motor and has a direct current speed controlling winding, and including rectifying means connected between the said alternating current winding arrangement and the speed controlling winding for supplying the speed controlling winding with direct current.

4. A speed control system according to claim 3, wherein the speed controlling winding comprises an armature winding of the direct current motor.

5. A speed control system for an electric motor having first and second speed controlling windings including means for producing a speed reference signal, means for producing a signal dependent on the motor speed, means for producing a feedback signal dependent on the voltage developed across the first speed controlling winding, current regulating means responsive differentially to the speed reference signal and to the said feedback signal for varying flow of electrical current from a supply source to the first speed controlling winding of the motor in a sense tending to maintain the said voltage in accordance with the speed reference signal, means responsive differentially to the said feedback signal and the motor speed dependent signal for producing a modifying signal dependent on the loading of the motor, and means for energising the second speed controlling winding of the motor in dependence upon the modifying signal in a sense such as to assist the speed reference signal whereby to compensate for motor loading.

6. A speed control system according to claim 5, wherein the current regulating means comprises a saturable reactor having an alternating current winding arrangement for connection between the supply source and the first speed controlling winding of the motor and for regulating the flow of current to that speed controlling winding, the saturable reactor having also a direct current control winding arrangement for receiving a control signal, and amplifying means for receiving the speed reference signal and the said feedback signal and for supplying the said control signal to the direct current winding arrangement of the saturable reactor whereby to control the electrical impedance of the said alternating current winding arrangement of the saturable reactor in dependence upon the net energisation of the amplifying means.

References Cited by the Examiner

UNITED STATES PATENTS

| | | | |
|---|---|---|---|
| 3,026,463 | 3/1962 | Wolke et al. | 318—327 |
| 3,037,157 | 5/1962 | Young | 318—327 X |
| 3,046,464 | 7/1962 | Miller | 318—327 X |
| 3,166,700 | 1/1965 | Zarleng | 318—308 X |

OTHER REFERENCES

German allowed application 1,055,096, April 16, 1959.

MILTON O. HIRSHFIELD, *Primary Examiner.*

ORIS L. RADER, *Examiner.*

S. GORDON, *Assistant Examiner.*